United States Patent Office 3,803,266
Patented Apr. 9, 1974

3,803,266
PHOSPHOROUS ESTERS AS COUPLING AGENTS FOR LITHIUM TERMINATED RESINOUS POLYMER
Gerald R. Kahle and Alonzo G. Kitchen, Bartlesville, Okla., assignors to Phillips Petroleum Company
No Drawing. Filed Oct. 30, 1972, Ser. No. 301,885
Int. Cl. C08f 19/08, 19/04
U.S. Cl. 260—879                                6 Claims

ABSTRACT OF THE DISCLOSURE

A phosphorous ester is used to couple resinous block copolymer chains formed using an organolithium initiator.

BACKGROUND OF THE INVENTION

This invention relates to the production of thermoplastic resinous branched block copolymers.

It is broadly known to produce resinous branched or radial block copolymers by initiating the polymerization of a vinyl substituted aromatic compound with an organolithium compound, thereafter adding a conjugated diene to produce a block copolymer chain having a terminal lithium atom which is then coupled with a polyfunctional agent to produce polymer with a plurality of chains radiating out from the polyfunctional agent. While a wide variety of polyfunctional agents are operable in such processes, if such an agent is to be commercially acceptable, it is necessary for it to give a clear product and to couple the polymer efficiently.

BRIEF SUMMARY OF THE INVENTION

It is an object of this invention to couple lithium terminated block copolymer chains; and It is yet a further object of this invention to produce radial resinous block copolymer having a high degree of clarity.

In accordance with the invention resinous block copolymer chains formed using a lithium initiator are coupled with a phosphorous ester.

DESCRIPTION OF THE PREFERRED EMBODIMENTS

Phosphorous esters suitable for use in this invention include triaryl phosphite; trialkyl phosphite; triaryl phosphate; trialkyl phosphate; and thiophosphoric acid esters. As such they can be represented by the structural formulae $(RO)_3P$, $(RO)_3P \rightarrow O$ and $(RO_3P \rightarrow S$, where R is either an aryl or alkyl radical. The aryl radical in the above esters can be phenyl or hydrocarbon substituted phenyl radicals having up to 12 carbon atoms total. The alkyl radical will contain 1 to 10 carbon atoms, preferably 1–2.

It presently appears that the coupling reaction can be depicted as follows:

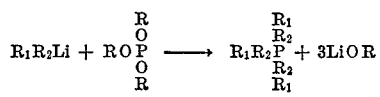

wherein $R_1$ is the monovinyl substituted aromatic polymer block and $R_2$ is the conjugated diene polymer block, thus giving a relatively transparent resinous radial block copolymer having a plurality of chains consisting essentially of a terminal block of monovinyl substituted aromatic compound polymer and a central block of a conjugated diene polymer, said central block being attached to the phosphorous atom.

The monovinyl substituted aromatic hydrocarbon monomers, or mixtures thereo, that are employed according to this invention to produce the block copolymer chains contain from 8 to 18 carbon atoms per molecule. Examples of suitable compounds include styrene, 3-methylstyrene, 4-n-propylstyrene, 4-cyclohexylstyrene, 4-decylstyrene, 2-ethyl-4-benzylstyrene, 4-p-tolylstyrene, 4-(4-phenyl-n-butyl)styrene, 1 - vinylnaphthalene, 2-vinylnaphthalene, and the like. The monovinyl-substitued aromatic hydrocarbon can contain alkyl, cycloalkyl, and aryl substituents, and combinations thereof, such as alkylaryl in which the total number of carbon atoms in the combined substituents is generally not greater than 12. Styrene is presently preferred.

The conjugated dienes and mixtures thereof that can be employed as monomers according to the invention generally contain from 4 to 12 carbon atoms per molecule and those containing 4 to 8 carbon atoms are preferred. Exemplary of suitable compounds are: 1,3-butadiene, isoprene, 2,3-dimethyl-1,3-butadiene, piperylene, 3-butyl-1, 3-octadiene, phenyl-1,3-butadiene, and the like. 1,3-butadiene is particularly preferred.

The polymerization initiators employed according to the invention are well known and can be broady depicted as organolithium initiators. Those preferred are hydrocarbyl monolithium compounds and can be represented by the formula RLi where R is a hydrocarbon radical selected from aliphatic, cycloaliphatic, or aromatic radicals containing from about 1 to 20 carbon atoms per molecule. Exemplary initiators suitable for use according to this invention include: n-butyllithium, sec-butyllithium, methyllithium, phenyllithium, naphthyllithium, p-tolyllithium, cyclohexyllithium, eicosyllithium, and the like, n-butyllithium is the preferred initiator.

The polymerization reaction is carried out in a hydrocarbon solvent under polymerization conditions at a temperature up to about 250° F., preferably below 230° F.

The terminal non-elastomeric segments of the block copolymer chains comprise 70–95, preferably 75–85 weight percent of the total block copolymer with the elastomeric segments comprising 30–5, preferably 25–15 weight percent of the total weight of the block copolymer based upon the total weight of all of the polymerized monomers incorporated. On coupling, the final product is resinous. The word "resinous" is used in its conventional sense to denote a normally solid material not having elastic properties. Generally, such materials will have a Shore D hardness (ASTM D 1706–61) of greater than 62, preferably greater than 69. These polymers can be made utilizing a multiple addition of monovinyl-substitued aromatic compound to give a final product wherein the chain branches radiating from a central nucleus have varying lengths in accordance with the method disclosed in Kitchen et al. U.S. 3,639,517, issued Feb. 1, 1972, the disclosure of which is hereby incorporated by reference. Alternatively, the polymers can be made in an identical manner except that all of the monovinyl substituted aromatic compound is added in a single increment.

Generally the phosphorous ester coupling agent will be added in an amount within the range of 0.1 to 0.7, preferably 0.2 to 0.4 mols per mol of lithium in the reaction system. Too much coupling agent can result in end capping, thus giving a linear polymer.

Example

In the following series of runs a polymer was prepared in accordance with the following procedure. Cyclohexane (2.6 pounds) was introduced into a reactor along with 0.1 part of tetrahydrofuran per 100 parts total monomer, the hydrocarbon solvent was then heated to initiation temperature of 142° F., and 169 g. of styrene was added. Thereafter 0.293 g. n-butyllithium as a one percent solution in cyclohexane was added. Over a period of about 5 minutes, the temperature reached a peak of 182° F. and a pressure at a maximum of 18 p.s.i.g. The styrene was allowed to react for 15 minutes at which time 56 g. butadiene was charged and the reaction allowed to proceed for another 20 minutes. At this point a small sample was removed for determining the melt flow before coupling. Then the coupling agents were added in the amounts shown hereinbelow. The solids content of the reaction mixture was 16 percent.

within the range of 0.1 to 0.7 mol per mol of said organolithium initiator.

2. A method according to claim 1 wherein said first monomer is styrene and said second monomer is 1,2-butadiene.

3. A method according to claim 1 wherein said first monomer is added in at least two increments.

TABLE I

| Run No. | Coupling agent | Moles per mole of nBuLi | Before coupling | | After coupling | | Percent Increase in MW[2] | Haze[3] |
|---|---|---|---|---|---|---|---|---|
| | | | M.F.[1] | MW×10⁻³ | M.F. | MW×10⁻³ | | |
| 1 | Triethyl phosphite | 0.3 | 22.7 | 85 | 4.6 | 147 | 73 | 2.7 |
| 2 | do | 0.3 | 17.0 | 88 | 5.7 | 150 | 70 | 2.2 |
| | Tetraethoxysilane | 0.2 | 25.5 | 85 | 4.6 | 150 | 76 | 1.7 |
| | do | 0.4 | 27.8 | 77 | 5.6 | 130 | 69 | 2.1 |
| | do | 1.0 | 18.6 | 81 | 4.8 | 157 | 94 | 1.9 |
| | Ethyltriethoxysilane | 0.3 | 30.6 | 78 | 5.2 | 133 | 71 | 3.5 |
| | Diethyldiethoxysilane | .25 | 24.2 | | 17.2 | | | |
| | do | .5 | 26.3 | | 22.5 | | | |
| | Epoxol 7-4 | 0.24 | 27.2 | 84 | 5.4 | 118 | 40 | 1.3 |
| | Epoxol 7-4 | 0.30 | 26.3 | 80 | 5.0 | 133 | 66 | 4.7 |

[1] Melt flow, g./min. ASTM D 1238-65T, condition C.
[2] Molecular weight.
[3] ASTM D 1003-61 using Gardner Hazeometer.

As can be seen the coupling agents of the instant invention are exceptionally effective in increasing the molecular weight and producing a polymer of low haze being essentially equal in both of these respects to the best materials previously known thus providing the art with a new class of exceptionally effective and desirable coupling agents.

While this invention has been described in detail for the purpose of illustration it is not to be construed as limited thereby but is intended to cover all changes and modifications within the spirit and scope thereof.

We claim:

1. In a method of forming polymers comprising initially contacting a first monomer of at least one monovinyl substituted aromatic compound having 8 to 18 carbon atoms with an organolithium initiator, and thereafter adding a second monomer of at least one conjugated diene containing from 4 to 12 carbon atoms per molecule, the improvement comprising thereafter adding a phosphorous ester coupling agent selected from the group consisting of triethyl phosphate and triethyl phosphite in an amount 4. A method according to claim 1 wherein said ester is triethyl phosphate.

5. A method according to claim 1 wherein said ester is triethyl phosphite.

6. A method according to claim 1 wherein said organolithium initiator is n-butyllithium, said first monomer is styrene, and said second monomer is butadiene.

References Cited
UNITED STATES PATENTS 3,220,989  11/1965  Rolik et al. _____ 260—94.7 A X
3,281,383  10/1966  Zelinski et al. __ 260—880 BU X
3,312,636   4/1967  Rizzo _____ 260—94.7 NU X
3,399,171   8/1968  Vogt et al. _____ 260—94.7 A JOSEPH L. SCHOFER, Primary Examiner
W. F. HAMROCK, Assistant Examiner U.S. Cl. X.R.

260—85.1, 94.7 R, A

UNITED STATES PATENT OFFICE
CERTIFICATE OF CORRECTION

Patent No. 3,803,266        Dated April 9, 1974

Inventor(s) Gerald R. Kahle, et al.

It is certified that error appears in the above-identified patent and that said Letters Patent are hereby corrected as shown below:

Claim 2, column 4, line 4, "1,2-butadiene."

should read -- 1,3-butadiene. --

Signed and sealed this 10th day of September 1974.

(SEAL)
Attest:

McCOY M. GIBSON, JR.
Attesting Officer

C. MARSHALL DANN
Commissioner of Patents